(12) United States Patent
Lin

(10) Patent No.: US 6,550,928 B1
(45) Date of Patent: Apr. 22, 2003

(54) LIGHT DEVICE FOR GENERATING FLASH LIGHTS

(75) Inventor: Yu Chuan Lin, Hsin Chuang (TW)

(73) Assignee: Superstar Lighting Co., Ltd., Taipei (TW)

( * ) Notice: Subject to any disclaimer, the term of this patent is extended or adjusted under 35 U.S.C. 154(b) by 0 days.

(21) Appl. No.: 10/043,338

(22) Filed: Jan. 14, 2002

(51) Int. Cl.⁷ ................................................. F21S 10/06
(52) U.S. Cl. ........................................ 362/35; 362/249
(58) Field of Search ............................ 362/35, 249, 363

(56) References Cited

U.S. PATENT DOCUMENTS 4,989,120 A * 1/1991 Davis et al. .................. 362/35
5,911,499 A * 6/1999 Stafford et al. .............. 362/240
6,250,768 B1 * 6/2001 Hill .............................. 362/35

* cited by examiner

Primary Examiner—Laura K. Tso

(57) ABSTRACT

A light device includes a motor having a spindle, two posts provided beside the motor and each having a conductor coupled to an electric source. A circuit board is secured on the spindle and rotated in concert with the spindle and has one or more light members, and has two conductors for electrically coupling to the conductors of the posts respectively and for energizing the light member. The conductors of the circuit board may be electrically coupled to the conductors of the posts intermittently when the motor is energized, in order to energize the light members intermittently.

9 Claims, 7 Drawing Sheets

LIGHT DEVICE FOR GENERATING FLASH LIGHTS

BACKGROUND OF THE INVENTION

1. Field of the Invention

The present invention relates to a light device, and more particularly to a light device for generating flash lights.

2. Description of the Prior Art

Typical light devices may include one or more light members or light bulbs for generating lights. Some of the light bulbs of the light devices may be controlled by processor devices and may flash or may be turned off and turned on alternatively for generating flash lights. The light bulbs may not be moved and may not be used to generate lights of different colors.

The present invention has arisen to mitigate and/or obviate the afore-described disadvantages of the conventional light devices.

SUMMARY OF THE INVENTION

The primary objective of the present invention is to provide a light device having movable or rotatable light bulbs or light members for generating flash lights.

The other objective of the present invention is to provide a light device having movable or rotatable light bulbs or light members for generating flash lights of various colors.

In accordance with one aspect of the invention, there is provided a light device comprising a motor including a spindle extended therefrom, two posts provided beside the motor, and each including a first conductor disposed thereon for coupling to an electric source, a circuit board secured on the spindle and rotated in concert with the spindle, at least one light member coupled to the circuit board, and the circuit board including a second and a third conductors for engaging with and for electrically coupling to the first conductors respectively to energize the light member. The second and the third conductors may be caused to be engaged with and electrically coupled to the first conductors respectively and intermittently when the motor is energized, in order to energize the light members intermittently. The light members may include different or various colors for generating various color lights.

An insulating sleeve is engaged on the spindle, a conductive barrel is engaged on the insulating sleeve, the second and the third conductors of the circuit board are electrically coupled to the spindle and the conductive barrel respectively.

The spindle includes a conductor tube secured thereon and electrically coupled to the second conductor.

A plate is further provided and secured on the barrel, and a hood is secured on the plate. The hood includes at least one rib secured therein and having a cavity formed therein for receiving the light member.

A casing is further provided, the motor is secured in the casing, the casing includes at least one rib extended therefrom and engaged with the motor for retaining the motor in the casing.

A base board is further provided, a housing is secured on the base board, the casing is received in the housing and secured on the base board, and a covering is secured on top of the housing.

One or more second light members are further provided and coupled to the circuit board. The hood may include the other ribs secured therein and each having a cavity formed therein for receiving the second light members.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
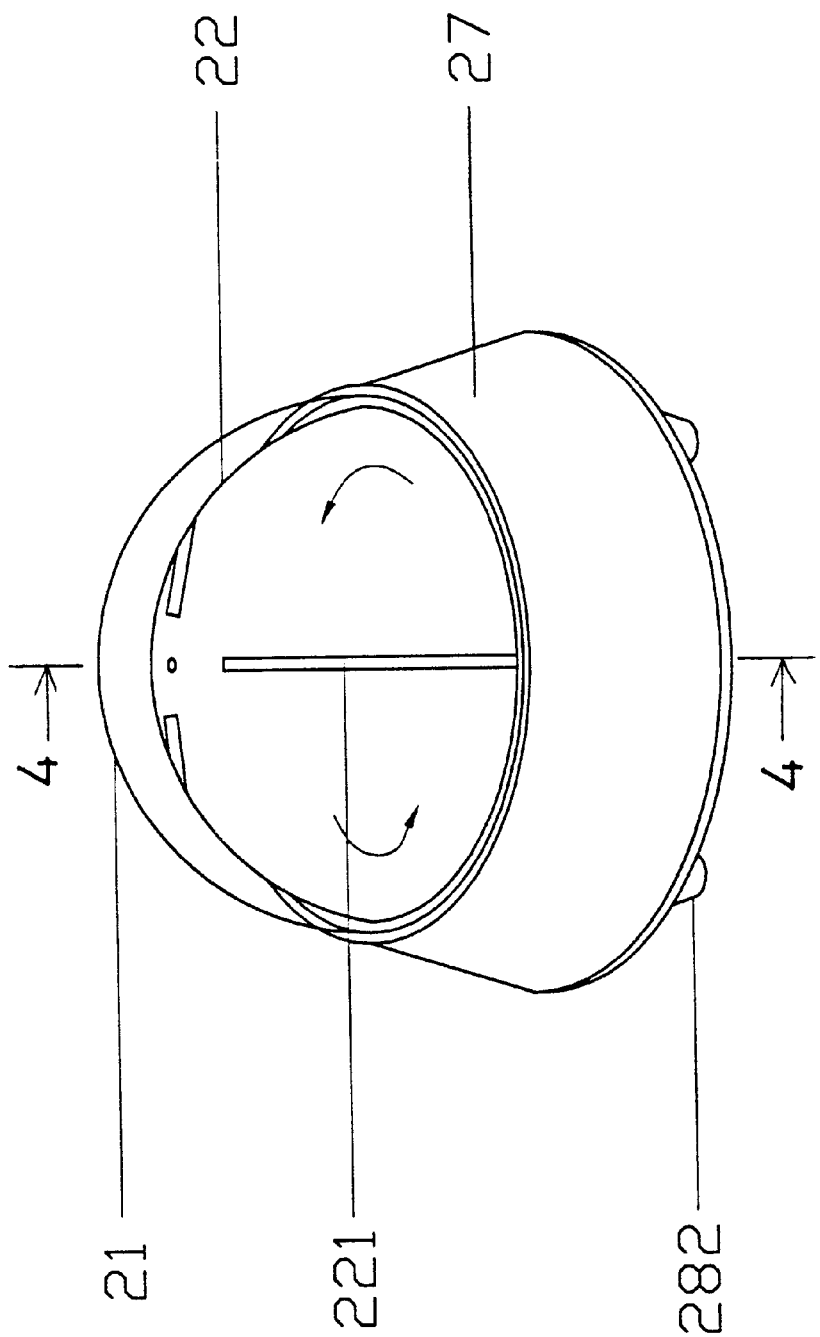
FIG. 1 is a perspective view of a light device in accordance with the present invention.
Figure 2:
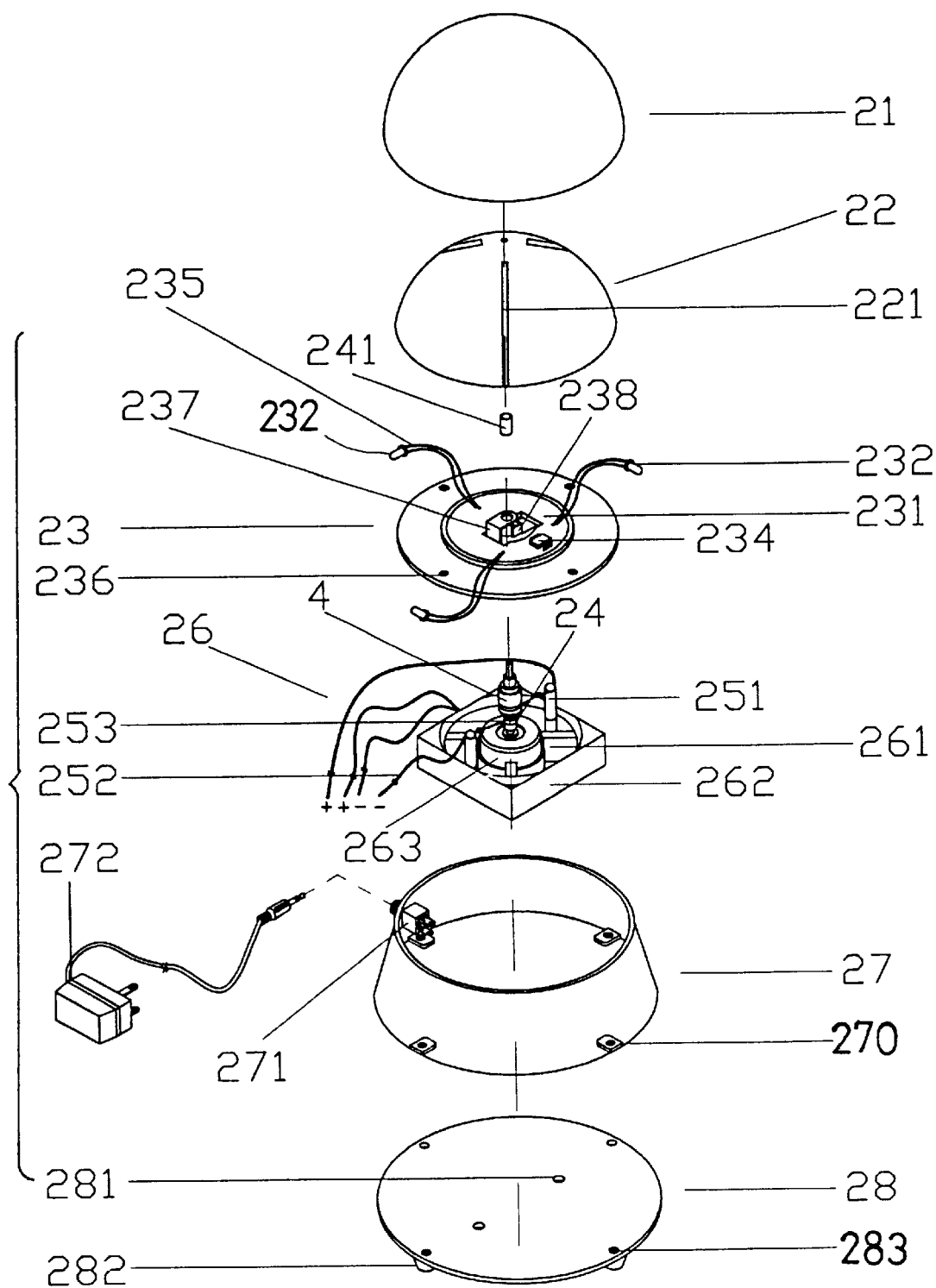
FIG. 2 is an exploded view of the light device.

Referring to the drawings, and initially to FIGS. 1–4, a light device in accordance with the present invention comprises a base board 28 including one or more holes 281 formed in the upper and middle portion thereof, and one or more pads 282 attached to the bottom thereof, and one or more apertures 283 formed in the outer peripheral portion thereof. A housing 27 includes one or more ears 270 extended or provided in the bottom peripheral portion thereof and aligned with the apertures 283 of the base board 28, for receiving fasteners 284 (FIG. 4) which may secure the housing 27 to and on top of the base board 28. A coupler 271 is secured to the peripheral portion of the housing 27, and is coupled to a plug 272 which may be coupled to various electric sources. A covering 21, such as a transparent or semi-transparent covering 21 is secured on top of the housing 27, best shown in FIG. 4, and may be applied with various kinds of colors and/or patterns thereon.

A driving device 26 includes a casing 262 disposed on the base board 28 and received in the housing 27, and secured to the base board 28 with fasteners which may be threaded through the holes 281 of the base board 28. A motor 263 is secured in the casing 262 with one or more ribs 261 and/or fasteners or latches or the other locks (not shown), and includes a spindle 24 extended therefrom or provided thereon. An electric insulating sleeve 233 is engaged and secured on the spindle 24. A conductive barrel 4 is secured onto the insulating sleeve 233, such that the conductive barrel 4 is not electrically coupled to the spindle 24 of the motor 263. Two posts 251 are secured in the casing 262 and disposed or provided beside the motor 263, and each includes a conductor 253, 254 secured thereon, and electrically coupled to the coupler 271 with electric cables or wires 252. The conductors 253, 254 are extended toward each other or extended toward the spindle 24 of the motor 263.

Figure 3:
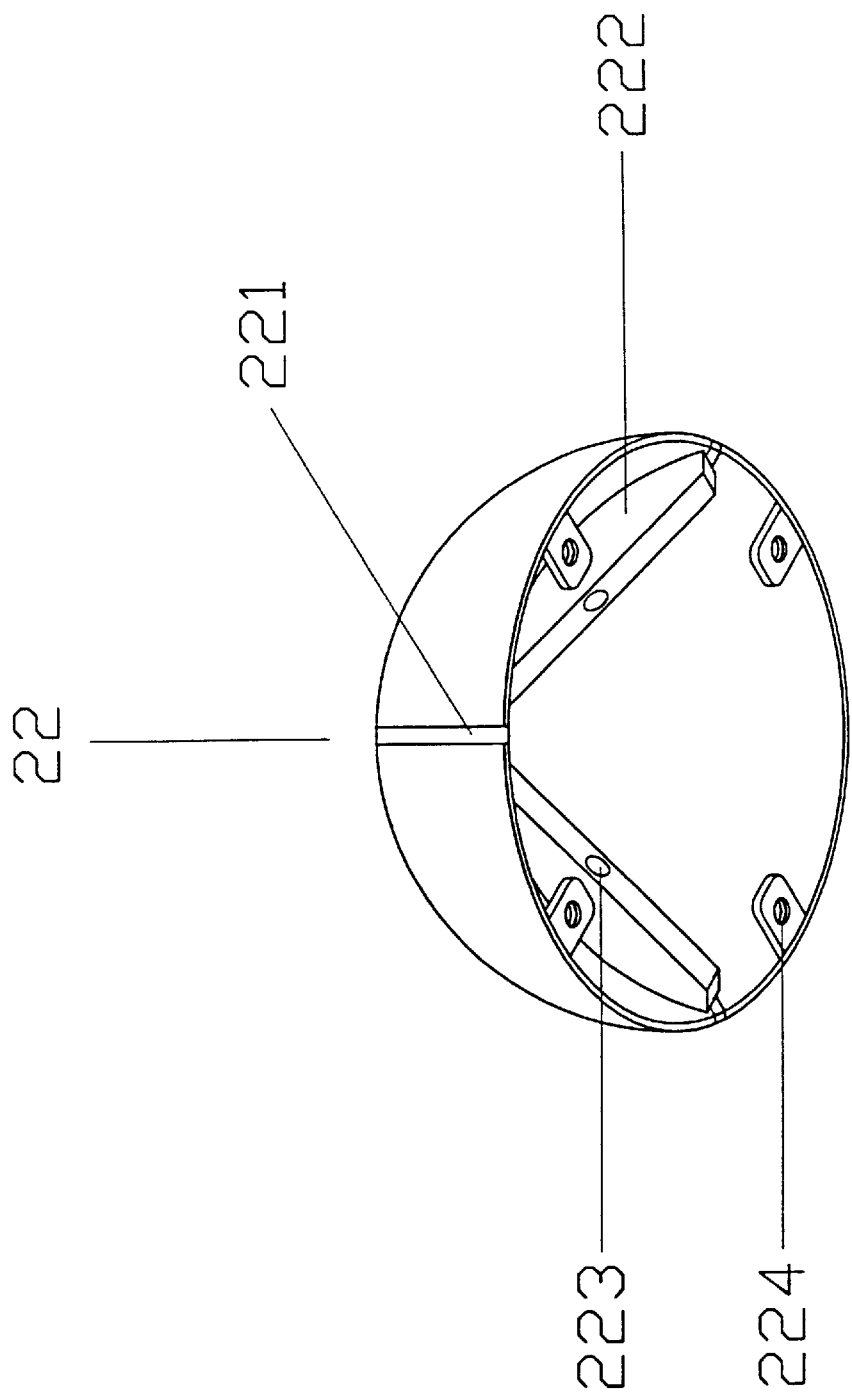
FIG. 3 is a bottom perspective view of a hood of the light device.

A plate, particularly an electric insulating plate 23 is secured onto the barrel 4, and is not electrically contacted with the barrel 4, and includes one or more orifices 236 formed in the outer peripheral portion thereof. A hood 22, such as a transparent or semi-transparent hood 22 includes one or more flaps 224 provided in the bottom peripheral portion thereof for securing to the plate 23 with fasteners 227 which may be threaded through or engaged through the orifices 236 of the plate 23, or threaded with the flaps 224. The hood 22 includes one or more slits 221 formed in the outer peripheral portion thereof, and includes one or more fins 222 disposed or secured therein and aligned with the slits 221 thereof for blocking the slits 221 thereof. The fins 222 each includes a cavity 223 formed therein (FIG. 3).

A circuit board 231 is disposed or secured on the plate 23 and is also not electrically contacted with the barrel 4, and includes one or more light members 232, such as the light emitting diodes, the illuminant members, or the light bulbs 232, coupled thereto with electric cables or wires 235, and engaged into the cavities 223 of the ribs 222 of the hood 22. The circuit board 231 includes an integrated circuit or a processor device 234 provided thereon and coupled to the light members 232 for controlling the on and off of the light members 232 or for causing the light members 232 to generate flash lights. The circuit board 231 includes a conductor 238 secured onto the conductive barrel 4 and thus electrically coupled to the conductive barrel 4, and includes another conductor 237 separated or spaced from the conductor 238. A tube or a ring or another conductor 241 is secured onto the spindle 24 and electrically coupled to the spindle 24. and is also secured or electrically engaged with the conductor 237, such that the conductors 237, 238 of the circuit board 231 may be electrically coupled to the spindle 24 and the conductive barrel 4 respectively.

Figure 4:
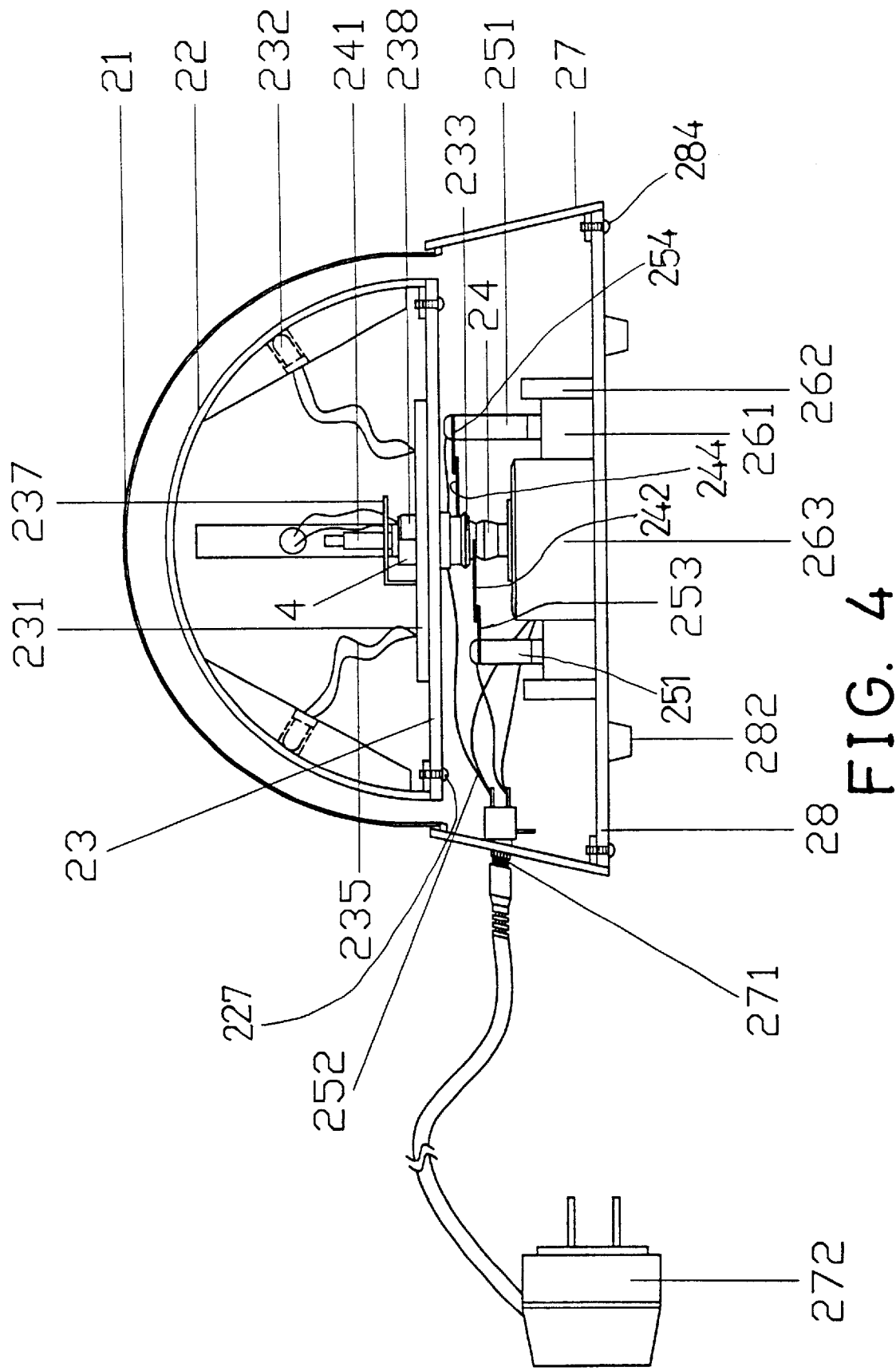
FIG. 4 is a cross sectional view taken along lines 4—4 of FIG. 1.

As best shown in FIG. 4, the spindle 24 and the conductive barrel 4 each includes another conductor members 242, 244, such as the conductor arms or flaps or blades, extended outward therefrom respectively, for electrically engaged with or contacted with the conductors 253, 254 respectively and/or intermittently while the spindle 24 is rotated or driven by the motor 263, and for energizing the light members 232.

In operation, as shown in FIG. 4, the conductors members 242, 244 may be kept to be electrically coupled to the conductors 253, 254 respectively, for allowing the light members 232 to be continuously energized when the motor 263 has not been energized. When the motor 263 is energized, the plate 23 and the circuit board 23 and the hood 22 may all be rotated by the motor 263 together with the spindle 24 of the motor 263. At this moment, the conductors members 242, 244 may be caused to be electrically coupled to the conductors 253, 254 intermittently, for allowing the light members 232 to be energized intermittently and to generate flash lights.

Figure 5:
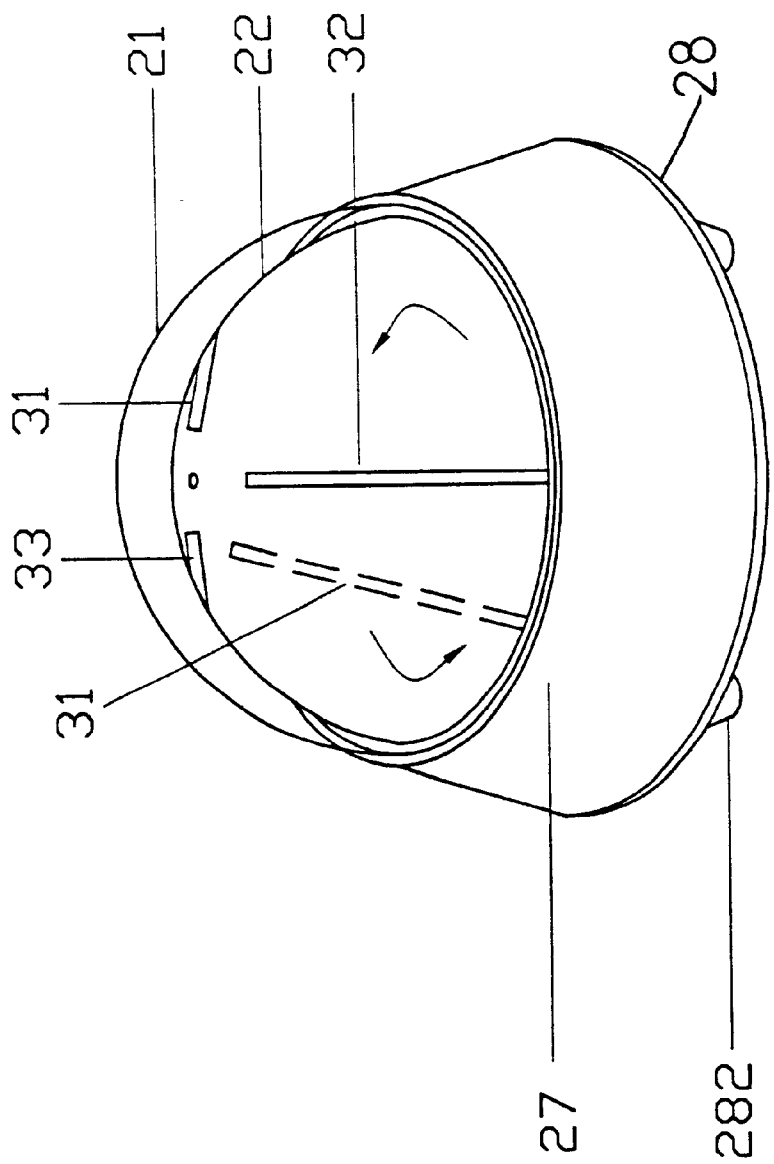
FIGS. 5, 6, 7 are perspective views illustrating the operation of the light device.
Figure 6:
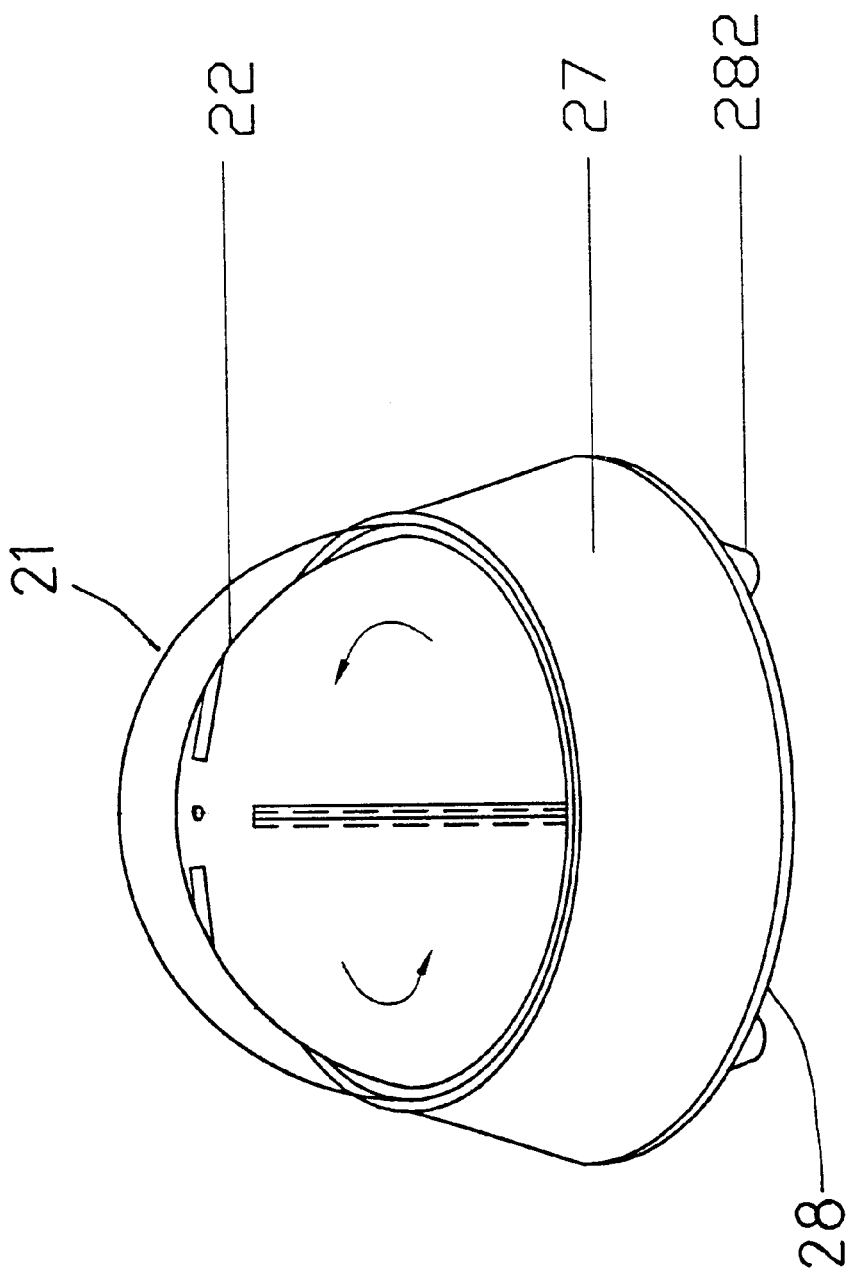
Figure 7:
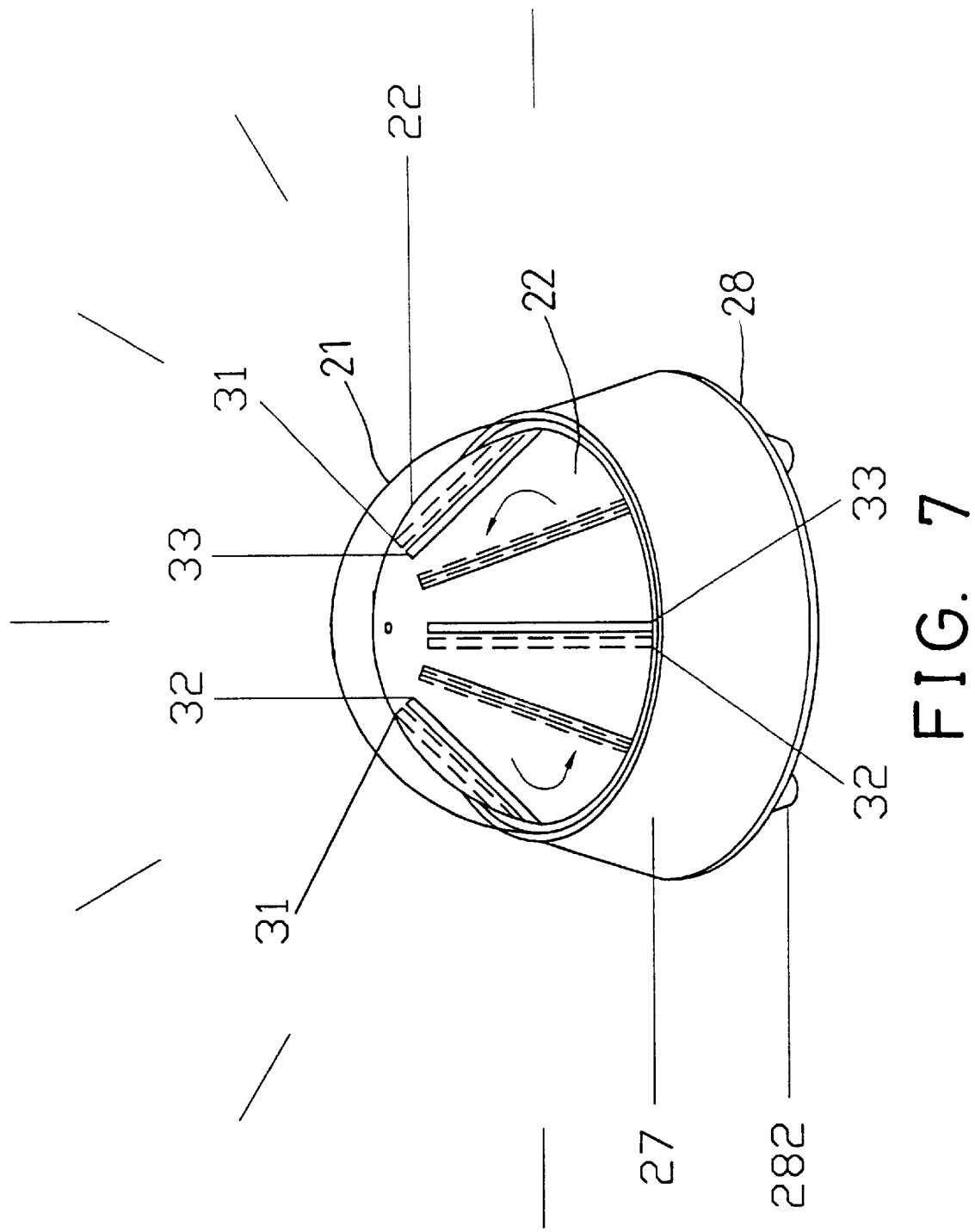

Referring next to FIGS. 5–7, for example, the ribs 222 of the hood 22, may include different colors, and/or the light members 232 that are engaged in the cavities 223 of the ribs 222 may include different colors, for generating lights 31, 32, 33 of different colors. Due to vision transiency, two or more of the lights 31, 32, 33 may be coincided or superposed with each other to generate a light of the other color. For example, when one of the colors 31, 32, 33 is red, the other light is green, and when the green light and the red light are superposed with each other, a blue light may be generated.

Accordingly, the light device in accordance with the present invention includes one or more movable or rotatable light bulbs or light members for generating flash lights that may include various colors.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A light device comprising:
   a motor including a spindle extended therefrom,
   two posts provided beside said motor, and each including a first conductor disposed thereon for coupling to an electric source,
   a circuit board secured on said spindle and rotated in concert with said spindle,
   at least one light member coupled to said circuit board, and
   said circuit board including a second and a third conductors for engaging with and for electrically coupling to said first conductors respectively to energize said at least one light member.

2. The light device according to claim 1 further comprising an insulating sleeve engaged on said spindle, a conductive barrel engaged on said insulating sleeve, said second and said third conductors of said circuit board being electrically coupled to said spindle and said conductive barrel respectively.

3. The light device according to claim 2, wherein said spindle includes a conductor tube secured thereon and electrically coupled to said second conductor.

4. The light device according to claim 2 further comprising a plate secured on said barrel, and a hood secured on said plate.

5. The light device according to claim 4, wherein said hood includes at least one rib secured therein and having a cavity formed therein for receiving said at least one light member.

6. The light device according to claim 1 further comprising a casing, said motor being secured in said casing, said casing including at least one rib extended therefrom and engaged with said motor for retaining said motor in said casing.

7. The light device according to claim 6 further comprising a base board, a housing secured on said base board, said casing being received in said housing and secured on said base board, and a covering secured on top of said housing.

8. The light device according to claim 1 further comprising at least one second light member coupled to said circuit board.

9. The light device according to claim 8 further comprising a plate secured on said barrel, and a hood secured on said plate, said hood including at least one rib secured therein and having a cavity formed therein for receiving said at least one second light member.

* * * * *